United States Patent
Hu et al.

(10) Patent No.: US 10,866,508 B2
(45) Date of Patent: Dec. 15, 2020

(54) METHOD FOR MANUFACTURING PHOTOMASK AND SEMICONDUCTOR MANUFACTURING METHOD THEREOF

(71) Applicant: TAIWAN SEMICONDUCTOR MANUFACTURING COMPANY LTD., Hsinchu (TW)

(72) Inventors: Wei-Chung Hu, New Taipei (TW); Chi-Ta Lu, Yilan County (TW); Chi-Ming Tsai, Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 111 days.

(21) Appl. No.: 16/182,951

(22) Filed: Nov. 7, 2018

(65) Prior Publication Data

US 2019/0354006 A1    Nov. 21, 2019

Related U.S. Application Data

(60) Provisional application No. 62/673,349, filed on May 18, 2018.

(51) Int. Cl.
*G06F 30/398*    (2020.01)
*G03F 1/70*    (2012.01)

(52) U.S. Cl.
CPC .............. *G03F 1/70* (2013.01); *G06F 30/398* (2020.01)

(58) Field of Classification Search
CPC ................................. G03F 1/70; G06F 30/398
USPC .......................................................... 716/52
See application file for complete search history.

(56) References Cited

U.S. PATENT DOCUMENTS

| | | |
|---|---|---|
| 8,762,900 B2 | 6/2014 | Shin et al. |
| 8,796,666 B1 | 8/2014 | Huang et al. |
| 8,812,999 B2 | 8/2014 | Liu et al. |
| 8,850,366 B2 | 9/2014 | Liu et al. |
| 8,906,595 B2 | 12/2014 | Liu et al. |
| 8,954,899 B2 | 2/2015 | Wu et al. |
| 9,093,530 B2 | 4/2015 | Huang et al. |
| 9,367,655 B2 | 6/2016 | Shih et al. |
| 9,390,217 B2 | 7/2016 | Wang et al. |
| 9,548,303 B2 | 1/2017 | Lee et al. |
| 2007/0234246 A1* | 10/2007 | Sinha ...................... G06F 30/39 716/52 |
| 2009/0307642 A1* | 12/2009 | Lai ........................... G06F 30/39 716/106 |
| 2011/0029937 A1* | 2/2011 | Kodera ............... G03F 7/70441 716/52 |
| 2012/0110523 A1* | 5/2012 | Bailey .................... G06F 30/398 716/53 |
| 2013/0198696 A1* | 8/2013 | Wang .................... G06F 30/398 716/51 |

(Continued)

*Primary Examiner* — Suchin Parihar
(74) *Attorney, Agent, or Firm* — WPAT, P.C., Intellectual Property Attorneys; Anthony King

(57) ABSTRACT

A method for manufacturing a photomask is provided. The method includes generating a plurality of virtual layouts; calculating a score for each of the plurality of virtual layouts in accordance with a total overlay area; comparing the scores of the plurality of virtual layouts and determining a modified layout having a target score out of the plurality of virtual layouts; and outputting the modified layout to a photomask. Each of the virtual layouts includes a plurality of the shifted features. A semiconductor manufacturing method is also provided.

20 Claims, 16 Drawing Sheets

(56) References Cited

U.S. PATENT DOCUMENTS

| | | | |
|---|---|---|---|
| 2015/0227670 A1* | 8/2015 | Gordon | G06F 30/398 716/52 |
| 2016/0125120 A1* | 5/2016 | Yu | G06F 30/398 716/52 |
| 2016/0378902 A1* | 12/2016 | Graur | G06F 30/39 716/52 |
| 2017/0004242 A1* | 1/2017 | Chang | G03F 1/68 |

* cited by examiner

US 10,866,508 B2

METHOD FOR MANUFACTURING PHOTOMASK AND SEMICONDUCTOR MANUFACTURING METHOD THEREOF

CROSS-REFERENCE TO RELATED APPLICATION

This application claims the benefit of U.S. Provisional Application No. 62/673,349, filed on May 18, 2018, which is incorporated by reference in its entirety.

BACKGROUND

A typical semiconductor design process includes numerous steps. Initially, a circuit designer prepares a schematic diagram that includes logical connections between logic elements that form an integrated circuit. The schematic diagram is then tested to verify that the logic elements and associated logical connections perform a desired function. Once the circuit is verified, the schematic diagram is converted into a mask layout database that includes a pattern of polygons. The polygons may represent the logic elements and the logical connections contained in the schematic diagram. The mask layout database is then converted into multiple photomasks, also known as masks or reticles, and photomasks may be used to form different layers of the integrated circuit on to a semiconductor wafer.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
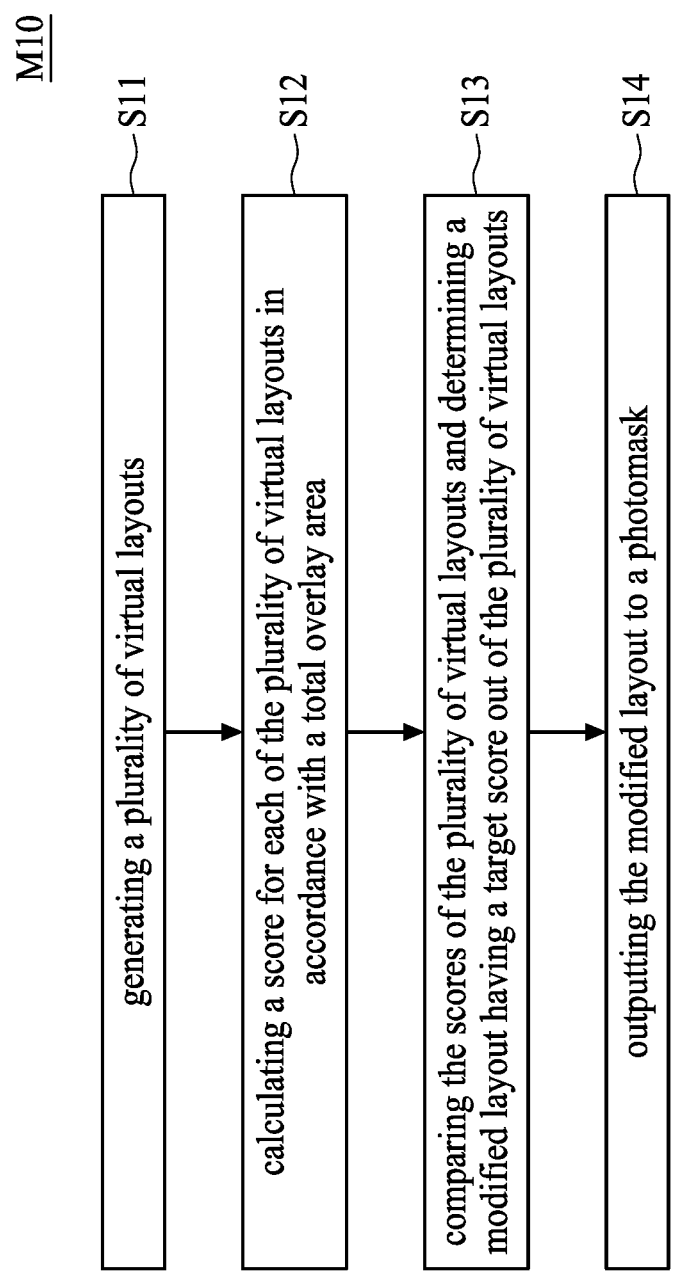
FIG. 1 is a flow chart in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

The advanced lithography process, method, and materials described in the current disclosure can be used in many applications, including fin-type field effect transistors (FinFETs). For example, the fins may be patterned to produce a relatively close spacing between features, for which the above disclosure is well suited. In addition, spacers used in forming fins of FinFETs can be processed according to the above disclosure.

Some embodiments of the present disclosure provide a method for manufacturing a photomask. Several virtual layouts are generated, and each of the virtual layouts includes many of shifted features. A score is calculated for each of the virtual layouts in accordance with a total overlay area between the shifted features and a first layout. The scores of the virtual layouts are compared with each other to determine a modified layout out of the several virtual layouts, wherein the modified layout has a target scores out of the scores. The modified layout is outputted to form a photomask. The target score can be a greatest or lowest score, or a score having a minimum absolute value to a predetermined score out of the several score. Some embodiments of the present disclosure provide a semiconductor manufacturing method including using a mask with the above semiconductor manufacturing method. The modified layout includes several shifted features that have a greatest total overlay area between the shifted features and the two sequentially formed patterns prior to and after formation of the shifted features. Some embodiments of the present disclosure provide a method of efficiently shifting several vias of a layout, wherein the vias are to be formed between two layers of metal patterns on a semicondcutor wafer or in a semiconductor device.

In the following description for the purpose of easy understanding, metal-via alignment and metal-via-metal alignment are used to illustrate a general concept of the present disclosure in some embodiments. However, it is not intended to limit the present disclosure. The present disclosure can be applied to adjust alignment of any two layers, three layers or multiple layers on a semicondcutor wafer or in a semiconductor device to reduce disconnection or breakdown issues of, for example, a circuit due to misalignment between different layers of the circuit.

Some embodiments of the present disclosure provide a method M10 for manufacturing a photomask as shown in FIG. 1. The method M10 includes (S11) generating a plurality of virtual layouts; (S12) calculating a score for each of the plurality of virtual layouts in accordance with a total overlay area; (S13) comparing the scores of the plurality of virtual layouts and determining a modified layout having a target score out of the plurality of virtual layouts; and (S14) outputting the modified layout to a photomask. Each of the virtual layouts in the operation (S11) includes a plurality of the shifted features. The photomask corresponding to the modified layout is used to form features, e.g. of a metal layer, on a semicondcutor wafer or in a semiconductor device.

Figure 2:
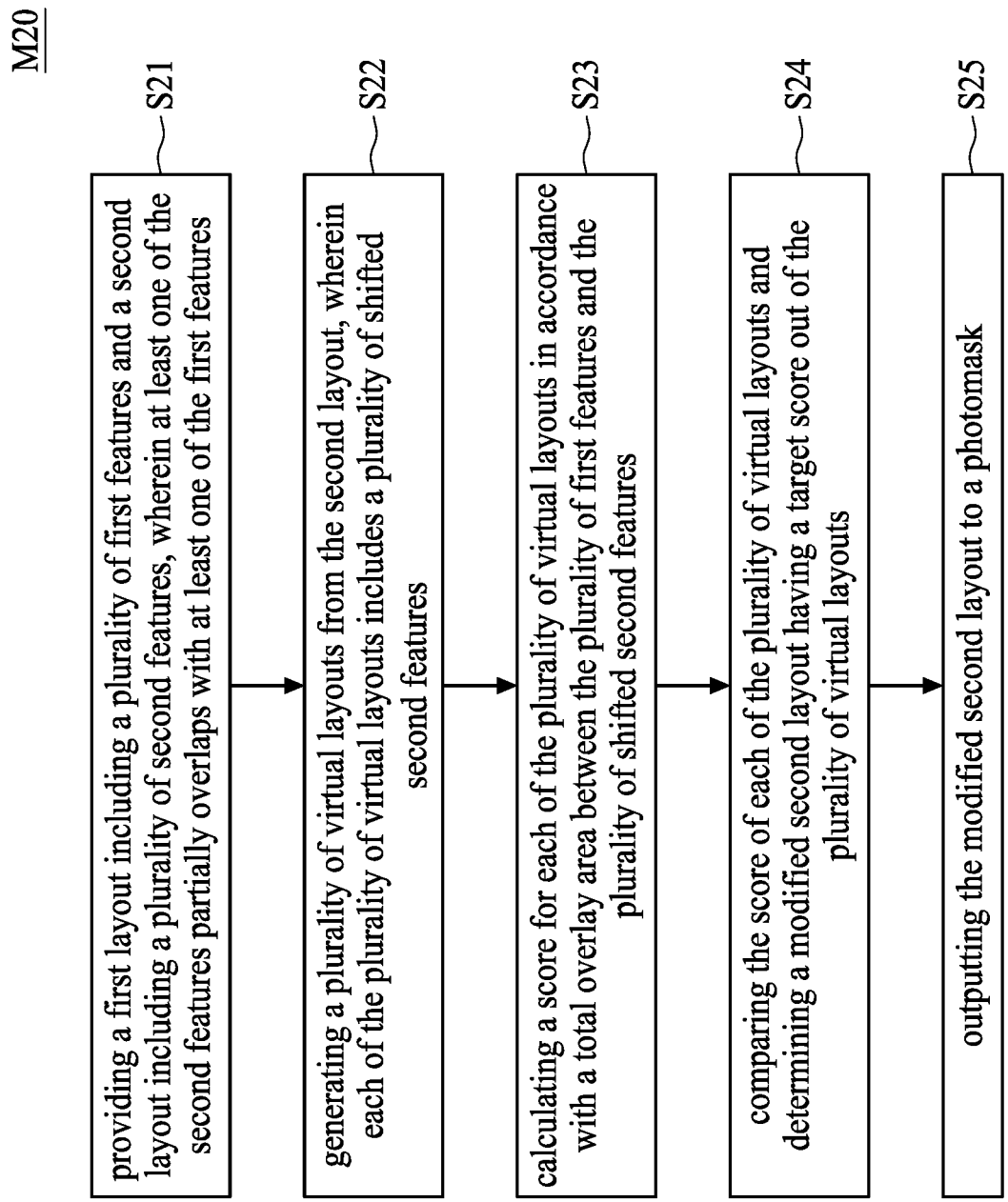
FIG. 2 is a flow chart in accordance with some embodiments of the present disclosure.

Some embodiments of the present disclosure provided a semiconductor manufacturing method M20 as shown in FIG. 2. The semiconductor manufacturing method M20 includes (S21) providing a first layout including a plurality of first features and a second layout including a plurality of second features, wherein at least one of the second features partially overlaps with at least one of the first features; (22) generating a plurality of virtual layouts from the second layout, wherein each of the plurality of virtual layouts includes a plurality of shifted second features; (S23) calculating a score for each of the plurality of virtual layouts in accordance with a total overlay area between the plurality of first features and the plurality of shifted second features; (S24) comparing the score of each of the plurality of virtual layouts and determining a modified second layout having a target score out of the plurality of virtual layouts; and (S25) outputting the modified second layout to a photomask. The photomask is used to form features, e.g. of a metal layer, on a semicondcutor wafer or in a semiconductor device.

The above methods are illustrated in more details in the following description by providing various embodiments. However, it is not intended to limit the present disclosure.

Figure 3:
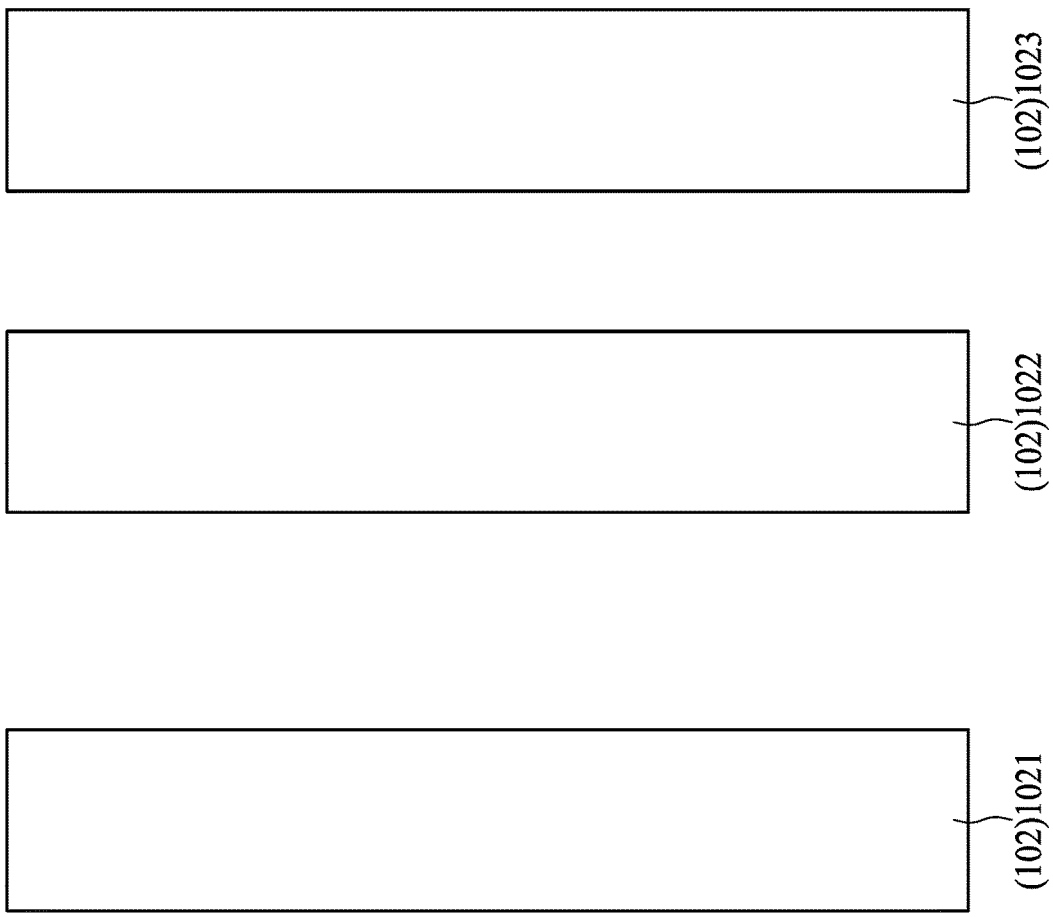
FIG. 3 is a diagram of a first layout in accordance with some embodiments of the present disclosure.

To further illustrate (S21) of the method M20, FIG. 3 is in accordance with some embodiments of the present disclosure. As shown in FIG. 3, a first layout 11 including a plurality of first features 102 is provided. The plurality of first features 102 includes first features 1021, 1022 and 1023. A distance between two adjacent first features 102 can be different. Shapes of the first features 102 are identical in the embodiments. Shapes of the first features 102, numbers of the first features 102, and distances between adjacent first features 102 of the first layout 11 as shown in FIG. 3 are for illustration but not to limit the present disclosure.

Figure 4:
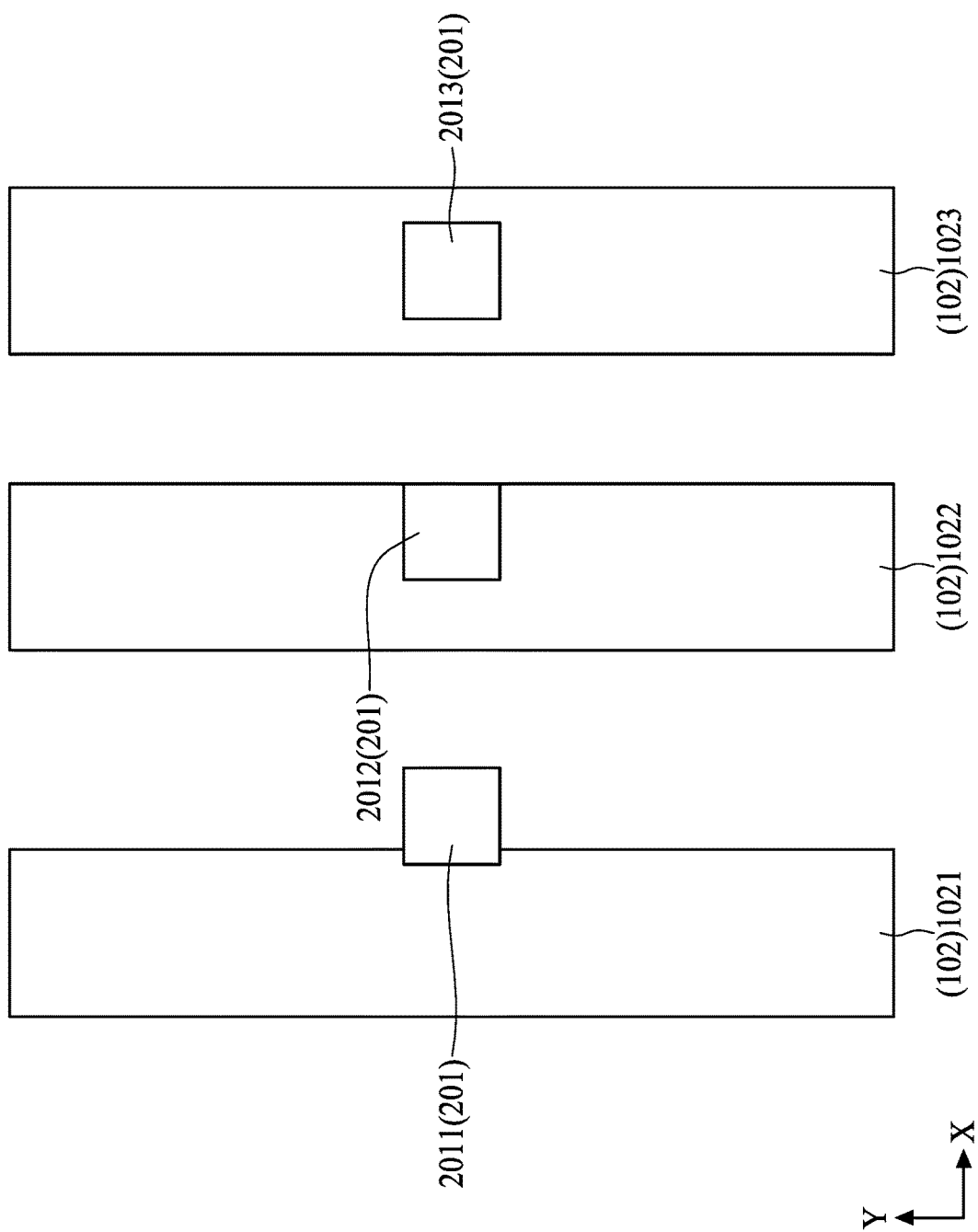
FIG. 4 is a diagram of a second layout overlapping the first layout in accordance with some embodiments of the present disclosure.

Referring to FIG. 4 to further illustrate the (S22) of the method M20, in accordance with some embodiments of the present disclosure, a second layout 20 including a plurality of second features 201 is provided. The plurality of the second features 201 include second features 2011, 2012 and 2013 corresponding to the first features 1021, 1022 and 1023 respectively. The second features 201 of the second layout 20 as shown in FIG. 4 have identical shapes and the same distances between any two adjacent second features 201 for illustration. There are misalignments between the second features 201 and the corresponding first features 102. In addition, at least one of the second features 201 of the second layout 20 partially overlaps with at least one of the first features 102 of the first layout 11. The first layout 11 represents a pattern of a first layer to be formed in semiconductor manufacturing operations, and the second layout 20 represents a pattern of a second layer to be formed under, over or at a level different from the level of the first layer in a semiconductor device. The first features 102 are also shown in FIG. 4 for illustration of relative positioning, from a top view perspective, of the first features 102 and the second features 201 to be formed on a semiconductor wafer. However the first features 102 are not included in the second layout 20. In some embodiments, the first layout 11 is a pattern of a metal layer to be formed in a semiconductor device and the second layout 20 is a pattern of a via layer to be sequentially formed over the metal layer for electrical connection with the metal layer of the semiconductor device. Some of the second features 201 of the second layout 20 partially overlap the first features 102 of the first layout 11. As shown in FIG. 4, the second feature 2011 is almost outside of the coverage area of the corresponding first feature 1021.

In accordance with (S11) of the method M10 and (S22) of the method M20, in order to increase a total overlay area between the first layout 11 and the second layout 20, a plurality of virtual layouts is generated from the second layout 20. Each of the virtual layouts includes a plurality of shifted second features 202. In other words, each of the second features 201 may be shifted in different distances to have different combinations and therefore to generate several virtual layouts. One of the virtual layouts is determined to be a modified layout to be output to a photomask. The photomask is used to fabricate the shifted second features 202 on a semiconductor wafer or in a semiconductor device.

Figure 5:
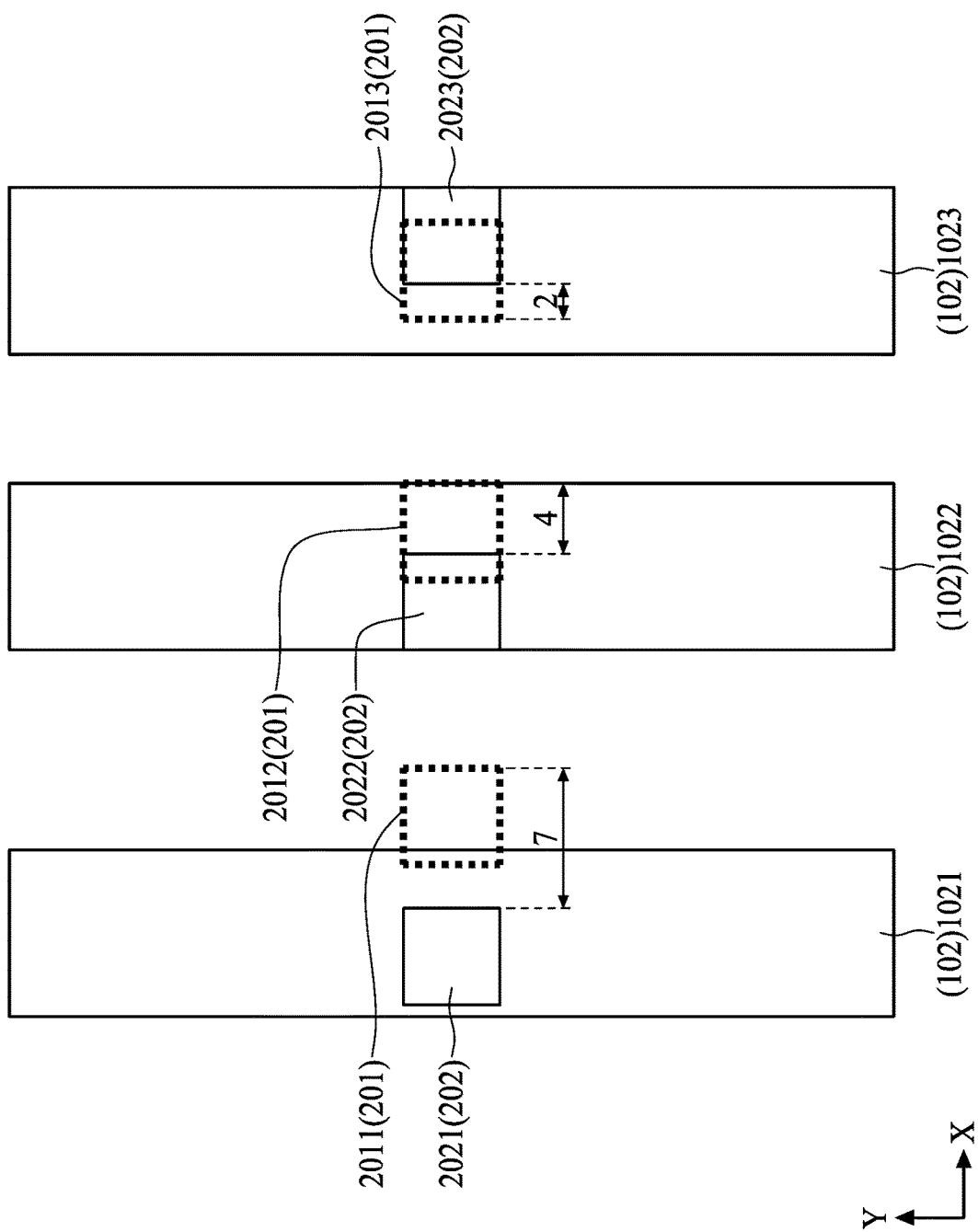
FIGS. 5 to 7 are diagrams of different virtual layouts overlapping the first layout in accordance with some embodiments of the present disclosure.
Figure 6:
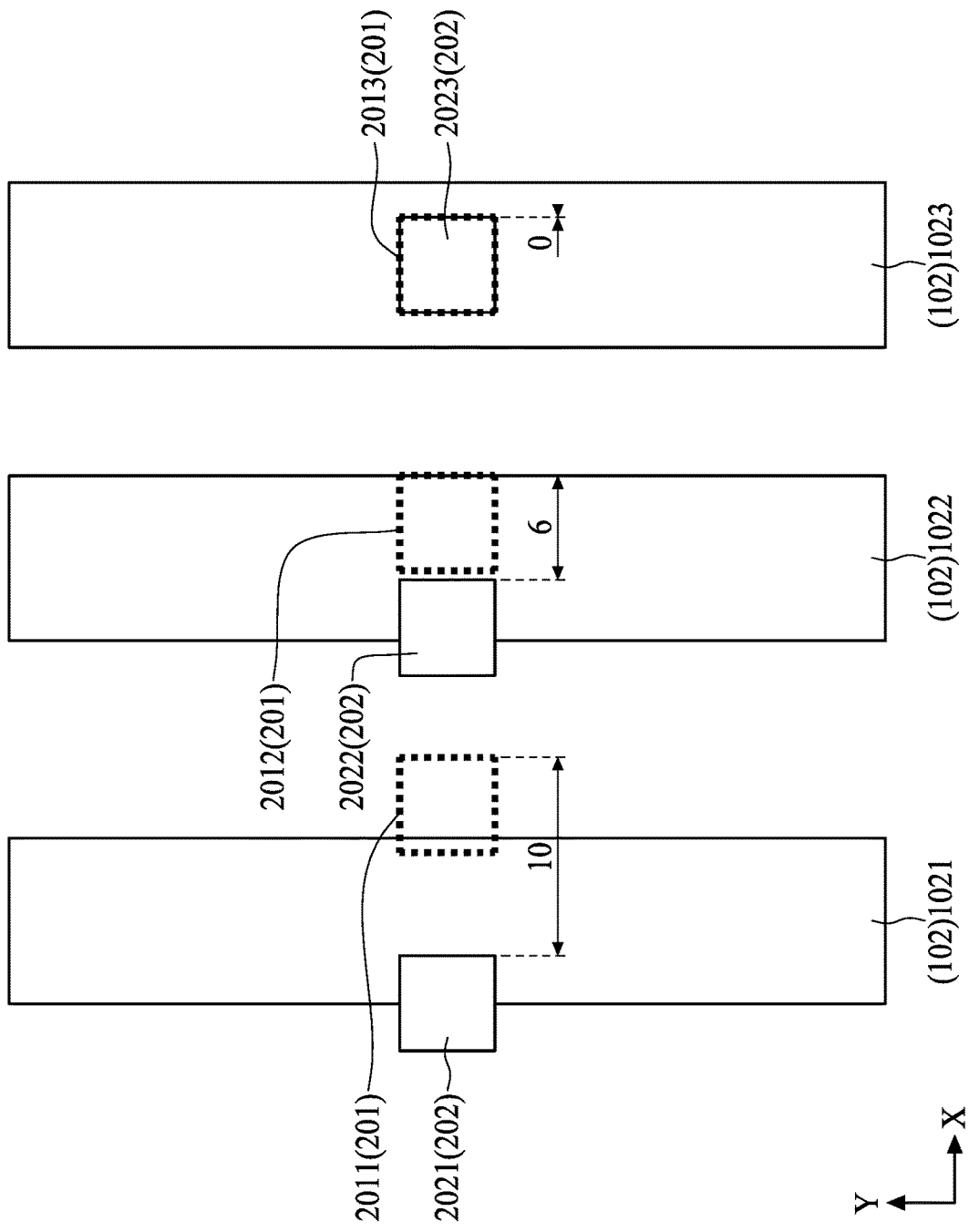
Figure 7:
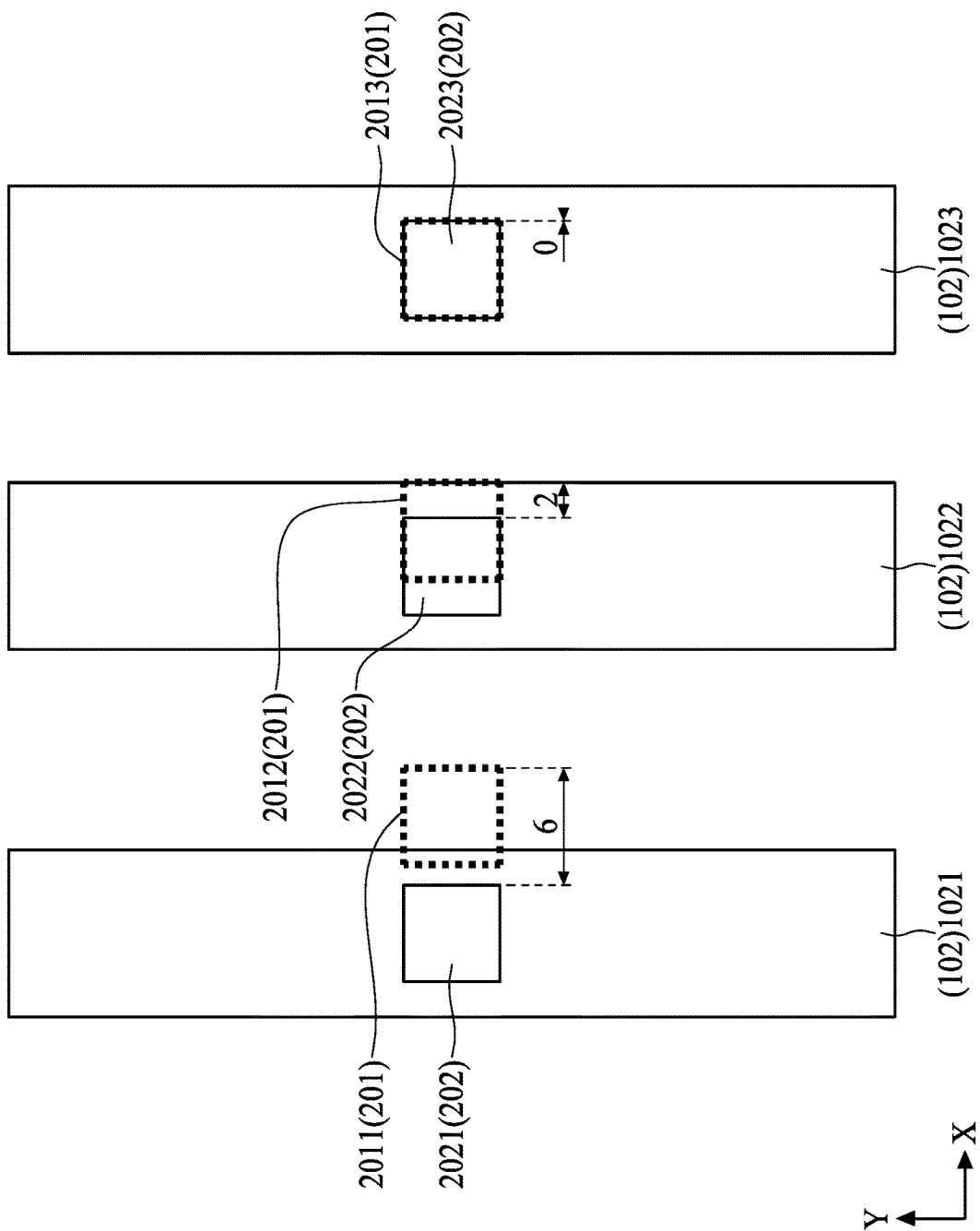

In accordance with (S12) to (S13) of the method M10 and (S23) to (S24) of the method M20, each of the virtual layouts is calculated to have a score in accordance with two scoring factors: a total overlay area between the first features 102 of the first layout 11 and the shifted second features 202; and a relative position between the each of the shifted second features 202 and each of the corresponding first features 102. FIGS. 5 to 7 show three virtual layouts 21, 22, 23 of the several virtual layouts for illustration. In some embodiments, the shifted second features 202 include a shifted second feature 2021, a shifted second feature 2022 and a shifted second feature 2023 corresponding to the second feature 2011, the second feature 2012 and the second feature 2013 respectively. A unit of distance suitable for calculating a distance of shifting can be selected, and the unit can be one nanometer, 10 nanometers or other suitable unit of distance of shifting. The unit is not limited herein.

In some embodiments of the present disclosure, the two scoring factors illustrated above are both considered in the operation of calculating the scores. For simple illustration, the scoring factor of "a total overlay area between each of the shifted second features 202 and each of the corresponding first features 102" is simplified to be the scoring factor TOA, or TOA. The scoring factor of "a relative position between the each of the shifted second features 202 and each of the corresponding first features 102" is simplified to be the scoring factor RP, or RP. Other scoring factors, besides TOA and RP, used for calculating the scores for the several virtual layouts can be applied to different applications. In addition, a weight percentage or priority of a scoring factor can be adjusted. In some embodiments of the present disclosure, the scoring factor TOA has a higher priority and greater weight percentage than the scoring factor RP. As for higher priority of TOA, for example, the TOA of each of the virtual layouts 21, 22 and 23 is calculated and then a RP of each of the virtual layouts 21, 22 and 23 is calculated. As for greater weight percentage of TOA, differences in TOA between the virtual layouts 21, 22 and 23 can influence the scores of the virtual layouts 21, 22 and 23 to a greater degree than differences in RP between the virtual layouts 21, 22 and 23.

Referring to FIG. 5, the virtual layout 21 is generated, wherein the virtual layout 21 includes a plurality of shifted second features 202, such as the shifted second features 2021, 2022 and 2023. The first features 102 are also shown in FIG. 5 for illustration of relative positioning between the first features 102 and the shifted second features 202, although the first features 102 are not included in the virtual layout 21. In addition, the second features 201 are shown in dotted lines for illustration of relative positioning between the second features 201 and the shifted second features 202 before and after shifting. The second feature 2011 is shifted left along a direction X by 7 units to become the shifted second feature 2021; the second feature 2012 is shifted left along the direction X by 4 units to become the shifted second feature 2022; and the second feature 2013 is shifted right along the direction X by 2 units to become the shifted second feature 2023. The shifting amount of 7 units to the left can be represented as −7, the shifting amount of 4 units to the left can be represented as −4, and the shifting amount of 2 units to the right can be represented as +2. Each of the values of −7, −4 and +2 is a shift value to a particular second feature (2021, 2022 and 2023 respectively), and thus the virtual layout 21 has a corresponding shift value set containing several shift values for each of the second features 202 of the second layout 20. As shown in FIG. 5, the virtual layout 21 including several shifted second features 202 is generated from the second layout 20. And a score is calculated for the virtual layout 21 according to the TOA and RP between the first layout 11 and the virtual layout 21, as shown in FIG. 5. For example, the score of the virtual layout 21 is determined to be 6850.

Referring to FIG. 6, the virtual layout 22 is generated, wherein the virtual layout 22 includes a plurality of shifted second features 202 such as the shifted second features 2021, 2022 and 2023. The first features 102 are also shown in FIG. 6 for illustration of relative positioning between the first features 102 and the shifted second features 202, although the first features 102 are not included in the virtual layout 22. In addition, the second features 201 are shown in dotted lines for illustration of relative positioning between the second features 201 and the shifted second features 202 before and after shifting. The second feature 2011 is shifted left along the direction X by 10 units to become the shifted second feature 2021; the second feature 2012 is shifted left along the direction X by 6 units to become the shifted second feature 2022; and the second feature 2013 is shifted by 0 units (not shifted) to become the shifted second feature 2023. The shifting amount of 10 units to the left can be represented as −10, the shifting amount of 6 units to the left can be represented as −6, and the shifting amount of 0 units can be represented as 0. Each of the values of −10, −6 and 0 is a shift value to a particular second feature (2021, 2022 and 2023 respectively), and thus each of the virtual layouts has a corresponding shift value set containing several shift values for each of the second features 202 of the second layout 20. In addition, the shift value set of the virtual layout 22 shown in FIG. 6 is different from the shift value set of the virtual layout shown in FIG. 5. The virtual layout 22 as shown in FIG. 6 including several shifted second features 202 is generated from the second layout 20. And a score is calculated for the virtual layout according to the TOA and RP between the first layout 11 and the virtual layout 22, as shown in FIG. 6. For example, the score of the virtual layout 22 is determined to be 3950 due to less total overlay area between the shifted second layout 22 and the first layout 11 than that between the shifted second layout 21 and the first layout 11.

Referring to FIG. 7, the virtual layout 23 is generated, wherein the virtual layout 23 includes a plurality of shifted second features 202, such as the shifted second features 2021, 2022 and 2023. The first features 102 are also shown in FIG. 7 for illustration of relative positioning between the first features 102 and the shifted second features 202. In addition, the second features 201 are shown in dotted lines for illustration of relative positioning between the second features 201 and the shifted second features 202 before and after shifting. The second feature 2011 is shifted left along the direction X by 6 units to become the shifted second feature 2021; the second feature 2012 is shifted left along the direction X by 2 units to become the shifted second feature 2022; and the second feature 2013 is shifted by 0 unit to become the shifted second feature 2023. Similarly, the shift value set of the virtual layout 23 shown in FIG. 7 is different from the shift value sets of the virtual layouts 21 and 22 shown in FIGS. 3 and 4. In addition, each of the shift value of a particular second feature can be the same or different. As illustrated in FIGS. 6 and 7, the shift values of the second feature 2013 are the same (both are 0 units) while the shifts values to the second features 2011 and 2012 are different. The virtual layout 23 as shown in FIG. 7 including several shifted second features 202 is generated from the second layout 20. A score is calculated for the virtual layout 23 according to the TOA and RP between the first layout 11 and the virtual layout 23, as shown in FIG. 7. For example, the score of the virtual layout 23 is determined to be 6950. The virtual layout 23 has the greatest score than that of the virtual layouts 21 and 22 due to higher sub-scores under both the scoring factors TOA and RP. It should be noted that merely three virtual layouts are shown for illustration, but this is not intended to limit a number of virtual layouts generated from the second layout 20.

In some embodiments, the score of each of the virtual layouts 21, 22 and 23 is in accordance with the total overlay area between the shifted second features 202 of the virtual layout 21 and the first features 102 of the first layout 11. In some embodiments, the score of each of the virtual layouts 21, 22 and 23 is in accordance with the total overlay area and a relative position of each of the shifted second features 202 and each of the corresponding first features 102 of the first layout 11. As shown in FIGS. 5 to 7, the virtual layout 22 has a total overlay area smaller than that of the virtual layout 21 and the virtual layout 23, and thus the virtual layout 22 has a lower score. The virtual layout 21 and the virtual layout 23 have equal total overlay areas but have different relative positions of the shifted second features 202 and the corresponding first features 102. Each of the shifted second features 2021, 2022 and 2023 is close to a center of each of the corresponding first features 1021, 1022 and 1023 respectively along the direction X. Thus, although the virtual layout 21 and the virtual layout 23 have the same TOA to the first layout 11, the score of the virtual layout 23 is higher than that of the virtual layout 21.

In some embodiments of the present disclosure, an RP is calculated by comparing a center of every one of the shifted second features 202 and a center of the corresponding first feature 102. In some embodiments of the present disclosure, a RP is calculated by determining a maximum value out of a plurality of minimum distances of from each of the several shifted second features 202 to an edge of the several first features 102. As illustrated in the virtual layouts 21, 22 and 23 of the embodiments shown in FIGS. 5 to 7, the scoring factor TOA has a higher priority, and the virtual layouts 21 and 23 having the same TOA (i.e., the highest TOA of the three TOA of the virtual layouts 21, 22 and 23) are targeted to calculate the RP. The virtual layouts 21 and 23 are compared which virtual layout includes more shifted second features 202 at or close to the center of the corresponding first features 102.

Figure 8:
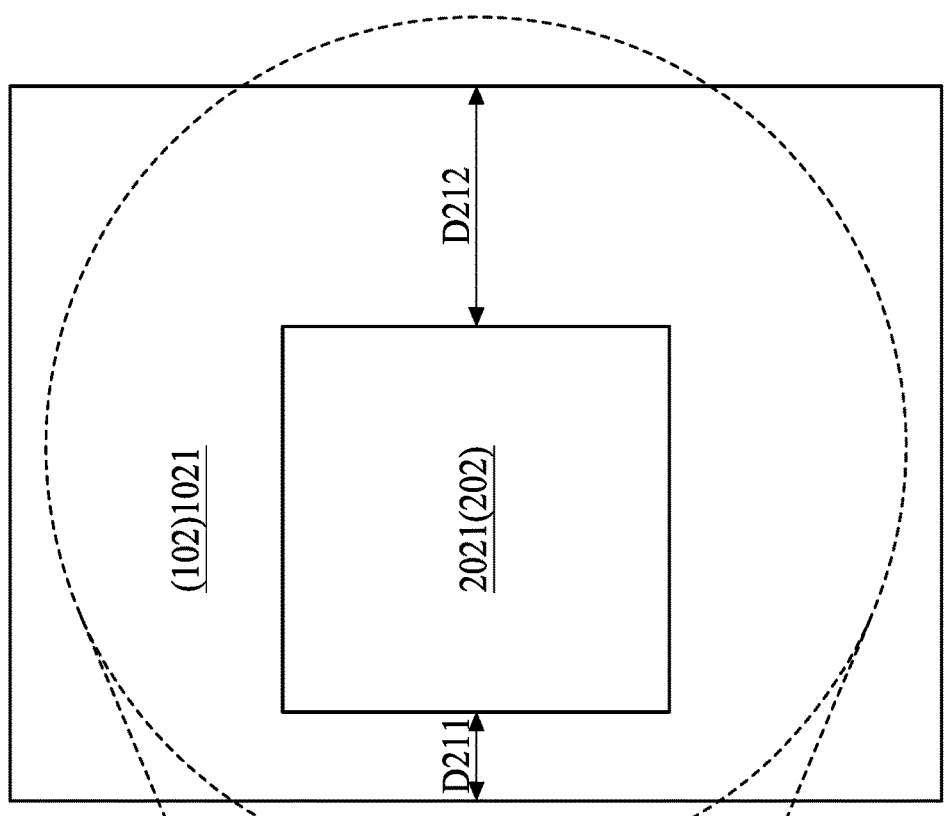
FIGS. 8 and 9 are diagrams of enlarged views of different virtual layouts in accordance with some embodiments of the present disclosure.

FIG. 8 shows an enlarged view of the shifted second feature 2021 of the virtual layout 21 on the corresponding first feature 1021 of the first layout 11. A distance D211 is a distance between the shifted second feature 2021 and an edge of the first feature 102 when the two layouts 21 and 11 overlap; and a distance D212 is a distance between the shifted second feature 2021 and another edge of the first feature 102 when the two layouts 21 and 11 overlap. The two edges of the first feature 1021 can be opposite to each other on the same line along the direction X. It should be noted that there are only two distances D211 and D212 provided in FIG. 8 for illustration, and a number of distances between the second feature 2021 and an edge of the first feature 1021 along the direction X is not limited herein. The distance D211 is calculated being the minimum distance (of multiple distances) between the second shifted feature 2021 and an edge of the first feature 102. The distance D211 is selected corresponding to the shifted second feature 2021 of the virtual layout 21.

Figure 9:
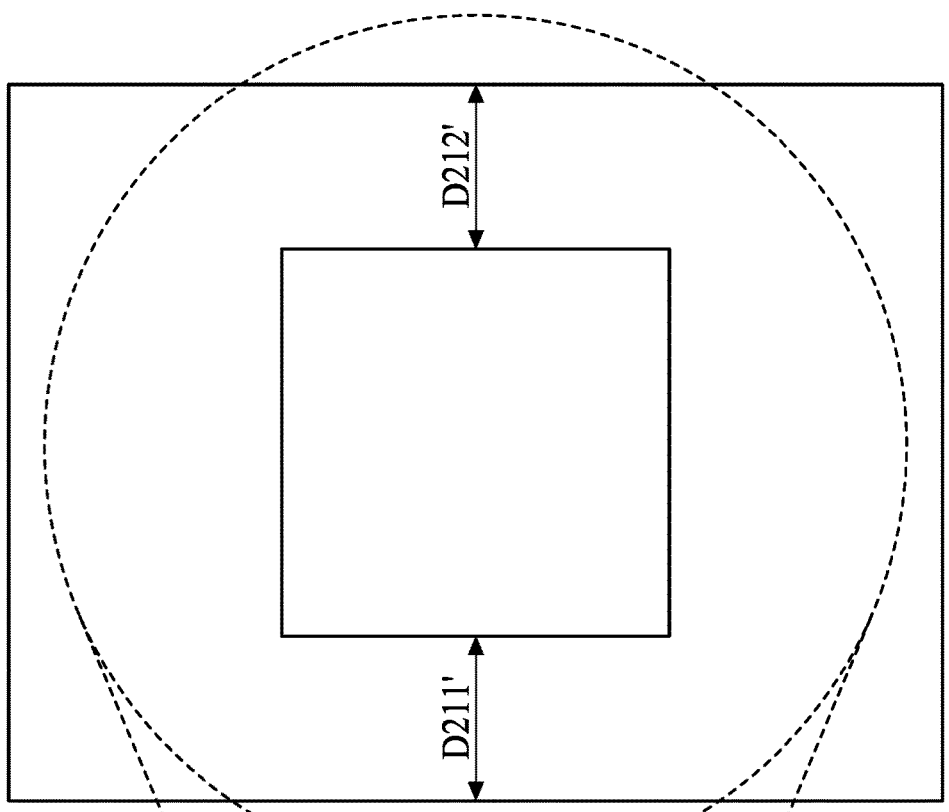

FIG. 9 shows an enlarged view of the shifted second feature 2021 of the virtual layout 23 projected onto the corresponding first feature 102 of the first layout 11. A distance D211' is a distance between the shifted second feature 2021 and an edge of the first feature 102 when the two layouts 23 and 11 overlap; and a distance D212' is a distance between the shifted second feature 2021 and another edge of the first feature 102 when the two layouts 23 and 11 overlap. The two edges of the first feature 1021 can be opposite to each other on the same line along the direction X. The distance D212' is the minimum distance (of multiple distances) between the second shifted feature 2021 and an edge of the first feature 102. The distance D212' is selected corresponding to the shifted second feature 2021 of the virtual layout 23.

The distance D211 and the distance D212' are compared to determine which is greater, wherein the greater distance indicates the position of the shifted second feature 2021 closest to a center of the corresponding first feature 102. And thus in the embodiments, the shifted second feature 2021 of the virtual layout 23 is determined to be closer to a center of the first feature 1021 than the shifted second feature 2021 of the virtual layout 23. Therefore, the shifted second feature 2021 of the virtual layout 23 is determined to have a higher score (or sub-score) under the scoring factor RP. RP is calculated for every one of the shifted second features 202 of every of the virtual layouts.

Since the scoring factor TOA has a higher priority and greater weight percentage than the scoring factor RP in such embodiments as shown in FIGS. 5 to 7, a lower TOA of the virtual layout 22 causes a much lower score than that of the virtual layout 21. In some embodiments, the scoring factor TOA is considered a major factor in influencing a score of a virtual layout, and RP can be considered to provide fine adjustment to the score of the virtual layout. Such illustration serves to facilitate easy understanding of the present disclosure, but is not intended to limit the scope of the present disclosure. In addition, priorities and weight percentages of scoring factors can be adjusted for different applications.

The scores of the several virtual layouts are compared to determine a modified layout out of the several virtual layouts. The modified layout has a target score out of the several scores. The target score represent a most optimal virtual layout, and the target score can be a greatest or lowest score, or a score closest to a predetermined value of all the scores acquired for every virtual layout. In some embodiments as illustrated above and in the FIGS. 5 to 7, the target score is the greatest score out of the several scores corresponding to the several virtual layouts, and thus the virtual layout 23 is determined to be the modified layout. The modified layout includes several shifted second features 202, wherein every one of the shifted second features 202 at least partially overlaps every one of the corresponding first features 102. The modified layout is outputted to a photomask used in formation of the shifted second features 202. Every one of the shifted second features 202 to be formed using the photomask is electrically connected with every one of the corresponding first features 102 to be formed.

In some embodiments, the target score can be the lowest score out of the several scores corresponding to the several virtual layouts, and the lowest score represent the most optimal virtual layout out of the several virtual layouts. In some embodiments, the target score is the score closest to a predetermined value. The predetermined value corresponds to a default optimal virtual layout, and the predetermined value is subtracted from each of the scores of each of the virtual layouts to generate a delta for each of the virtual layouts. Absolute values of the deltas are compared to determine which of the deltas has the lowest absolute value and thus shall indicate which of the virtual layouts is to be the modified layout. The modified layout is determined to be the most optimal virtual layout out of the several virtual layouts. The modified layout is outputted to a photomask used in formation of the shifted second features 202.

Figure 10:
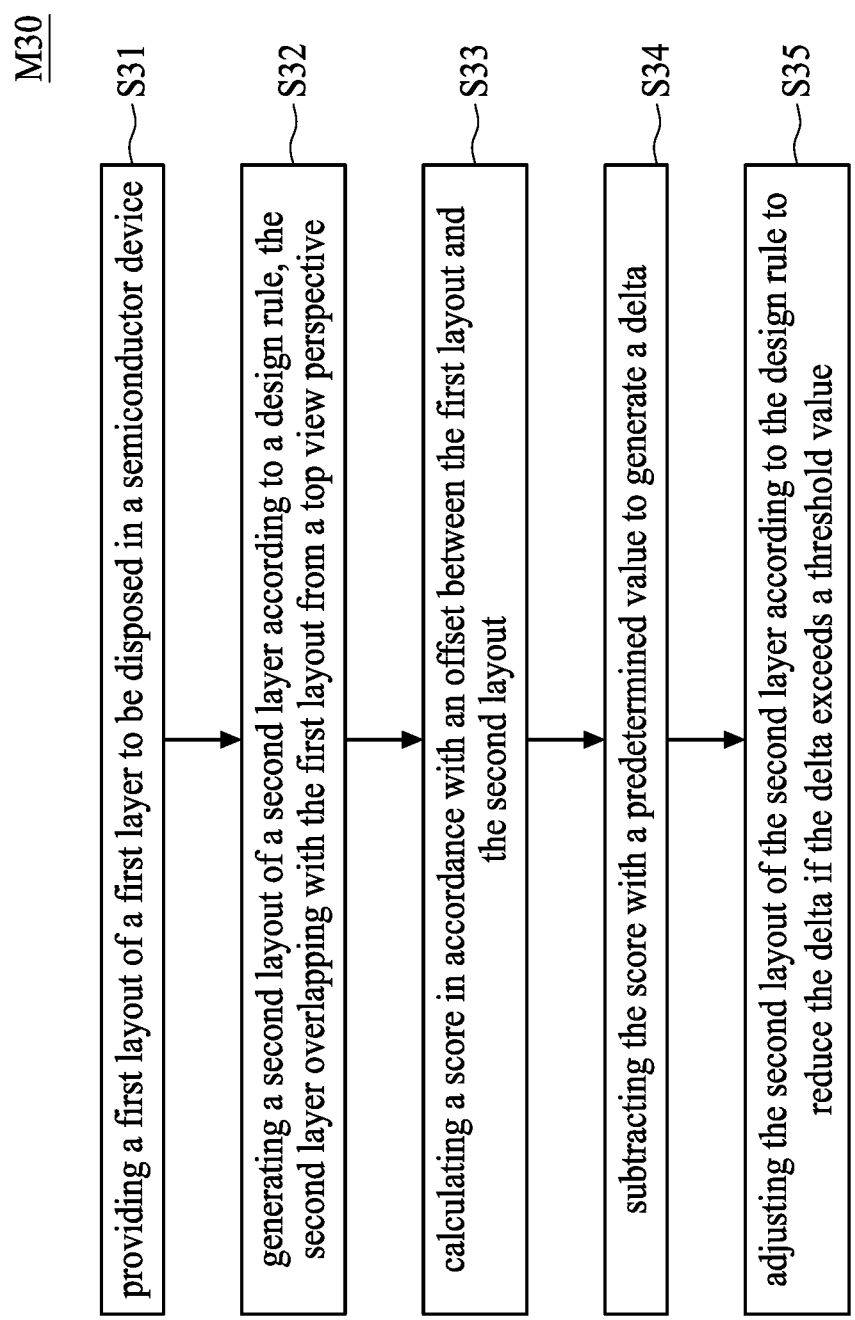
FIG. 10 is a flow chart in accordance with some embodiments of the present disclosure.

The scoring factors and the delta as described above can be related to offsets the between the first layout 11 and the second layout 20. Some embodiments of the present disclosure provide a semiconductor manufacturing method M30 as shown in FIG. 10. The semiconductor manufacturing method M30 includes (S31) providing a first layout of a first layer to be disposed in a semiconductor device; (S32) generating a second layout of a second layer according to a design rule, the second layer overlapping with the first layout from a top view perspective; (S33) calculating a score in accordance with an offset between the first layout and the second layout; (S34) subtracting a predetermined value from the score to generate a delta; and (S35) adjusting the second layout of the second layer according to the design rule to reduce the delta if the delta exceeds a threshold value.

In some embodiments of the present disclosure, a first layout of a first layer is provided to be disposed in a semiconductor device. The first layout in such embodiments is similar to the first layout 11 as illustrated in other embodiments. A second layout of a second layer is generated according to a design rule, and the second layout at least partially overlaps with the first layout. The second layer to be formed is at a level of elevation different from that of the first layer in the semiconductor device, and the second layer overlaps with the first layer. The second layout in such embodiments is similar to the second layout 20 as illustrated in other embodiments, and can be similar to the layout illustrated in FIG. 4 with the first and second layouts overlapping. A score is calculated in accordance with an offset between the first layout and the second layout, and a predetermined value is subtracted from the score to generate a delta. The second layout of the second layer is adjusted according to the design rule to reduce the delta if the delta exceeds a threshold value.

Using the first layout 10 as shown in FIG. 3 for illustration in (S31) of the method M30. Using the second layout 20 shown in FIG. 4 for illustration in (S32) of the method M30. A score is calculated in accordance with an offset between the firt layout 10 and the second layout 20 in (S33) of the method M30. In some embodiments, a TOA between the first features 102 and the second features 201 is calculated and an offset between the first layout 11 and the second layout 20 under the scoring factor TOA is also calculated. The predetermined value corresponds to a default optimal virtual layout, and the predetermined value can include a default optimal TOA value for the first features 102. The predetermined value is subtracted from the score to generate a delta in (S34) of the method M30. The threshold value can be an acceptable value, and, in an embodiment, the delta under the scoring factor TOA represents a difference between the first features 102 and the second features 201 under the scoring factor TOA. The second features 201 are shifted to adjust the second layout 20 according to the design rule to reduce the delta if the delta exceeds a threshold value in (35) of the method M30. In other words, under a condition of the delta exceeding the threshold value, the second features 201 of the second layout 20 are shifted to generate the modified layout, and the modified layout corresponds to a delta that does not exceed the threshold value. In some embodiments, a plurality of virtual layouts (e.g., the virtual layouts 21, 22 and 23) are generated to compare deltas for each of the plurality of virtual layouts, and a virtual layout with a lowest delta is determined to be the modified layout. If the delta does not exceed the threshold value, the second layout is in an acceptable and workable condition, and there is no need to shift the second features 201 of the second layout 20.

In some embodiments of the present disclosure, all virtual layouts are complied with a design rule. Two adjacent shifted second features have a minimum workable distance because of, for instance, limits of lithography. Other design rules should be applied to ensure the photomask output from the modified layout, and it can be adjusted according to different requirements.

Figure 11:
FIG. 11 is a diagram of a first design layout in accordance with some embodiments of the present disclosure.
Figure 11:
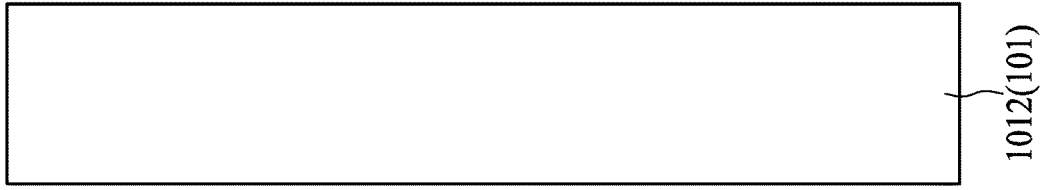
Figure 11:
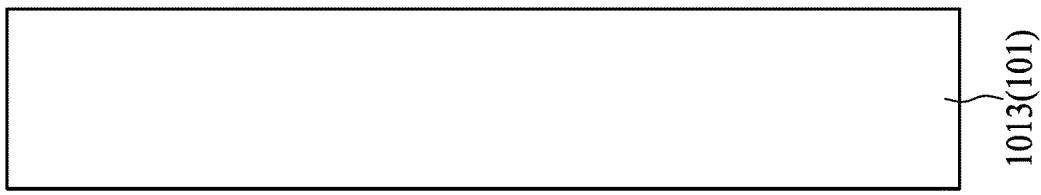
Figure 12:
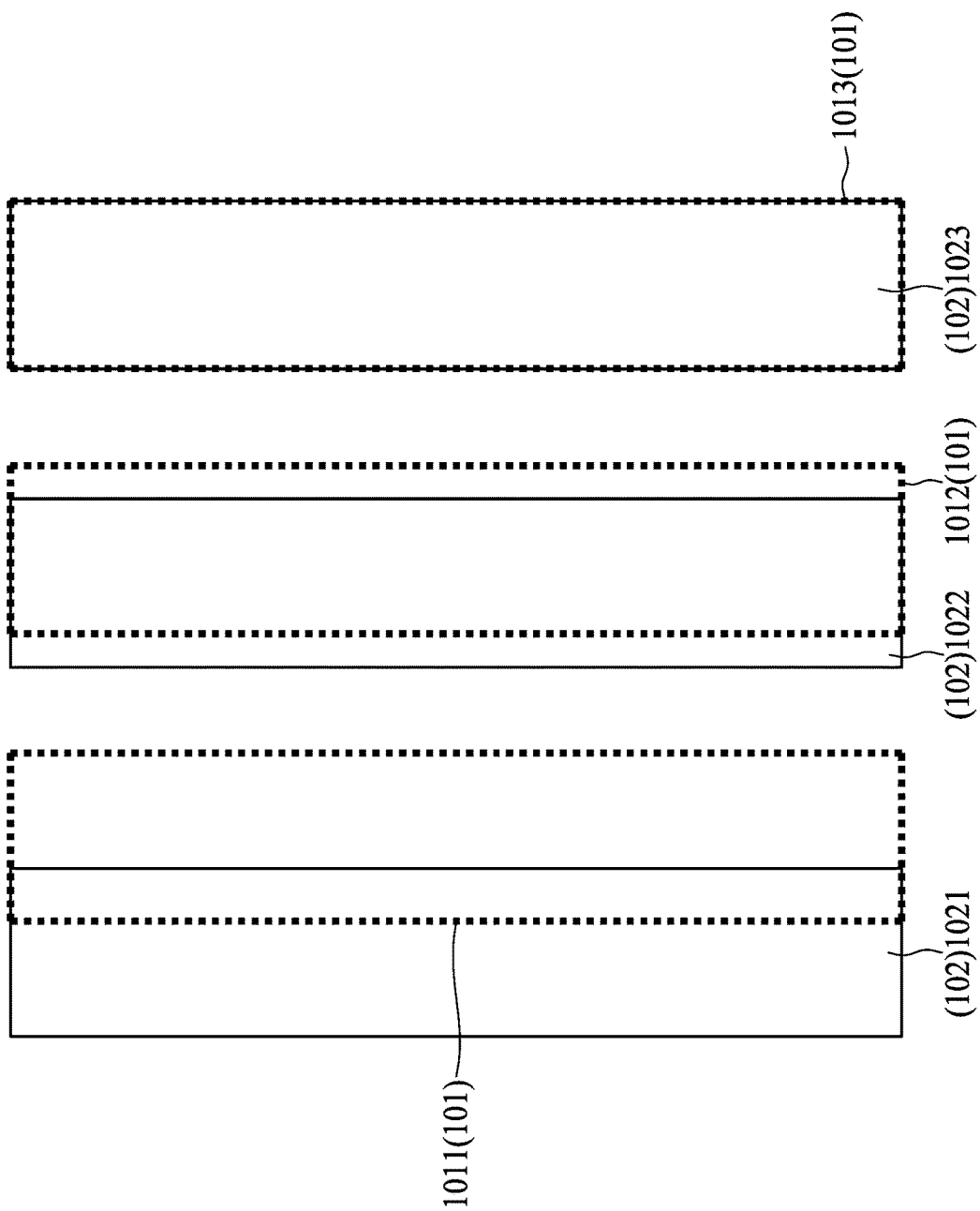
FIG. 12 is a diagram showing the first layout after shifting in accordance with some embodiments of the present disclosure.

In some embodiments of the present disclosure, the first layout 11 is generated from a first original layout 10 by an optical proximity correction (OPC) operation. As shown in FIG. 11, in accordance with some embodiments of the present disclosure, the first design layout 10 of a pattern of a metal layer to be formed in a semiconductor device is generated or provided by a circuit designer. The first design layout 10 includes a plurality of first design features 101. As shown in FIG. 11, in some embodiments, the first design features 101 include three first design features 1011, 1012 and 1013. The OPC operation is performed on the first design layout 10 to generate the first layout 11 from the first design layout 10. At least a first design feature 101 is shifted or retargeted in the OPC operation. Referring to FIG. 12, the first features 1021, 1022 and 1023 of the first layout 11 is generated by retargeting the first design features 1011, 1012 and 1013 respectively of the first design layout 10. The first design features 101 are shown in FIG. 12 to provide easier understanding of relative positions prior to and after retargeting by the OPC operation.

Figure 13:
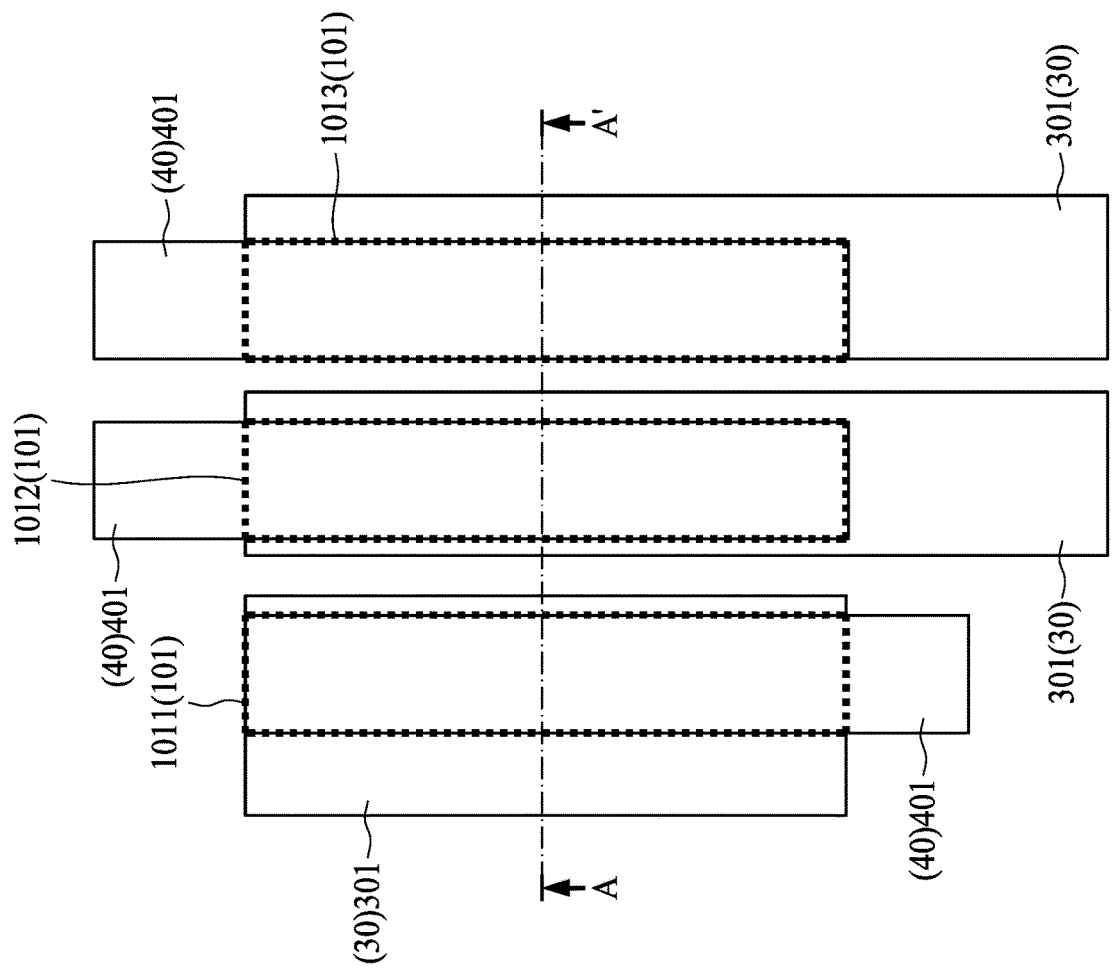
FIG. 13 is a diagram of two layouts of different layers to be formed in a semiconductor device from a top view perspective in accordance with some embodiments of the present disclosure.

In some embodiments of the present disclosure, the first layout 11 can represent an area common to two patterns of two layers to be formed. Referring to FIG. 13 in accordance with some embodiments of the present disclosure, a third layout 30 including a plurality of third features 301 is provided, and a fourth layout 40 including a plurality of fourth features 401 is provided. The fourth layout 40 overlaps the third layout 30. The first layout 11 can be a common area of the third layout 30 and the fourth layout 40 as shown in FIG. 13. In some embodiments, the third layout 30 and the fourth layout 40 represent patterns of a first metal line and a second metal line to be formed respectively in an interconnect structure of a semiconductor device at a different level of elevation, and the second layout 20 is a pattern of a via layer to be formed for electrical connection between the two metal lines. In some embodiments, the third layout 30 and the fourth layout 40 can be generated from design layouts after an OPC operation.

Figure 14:
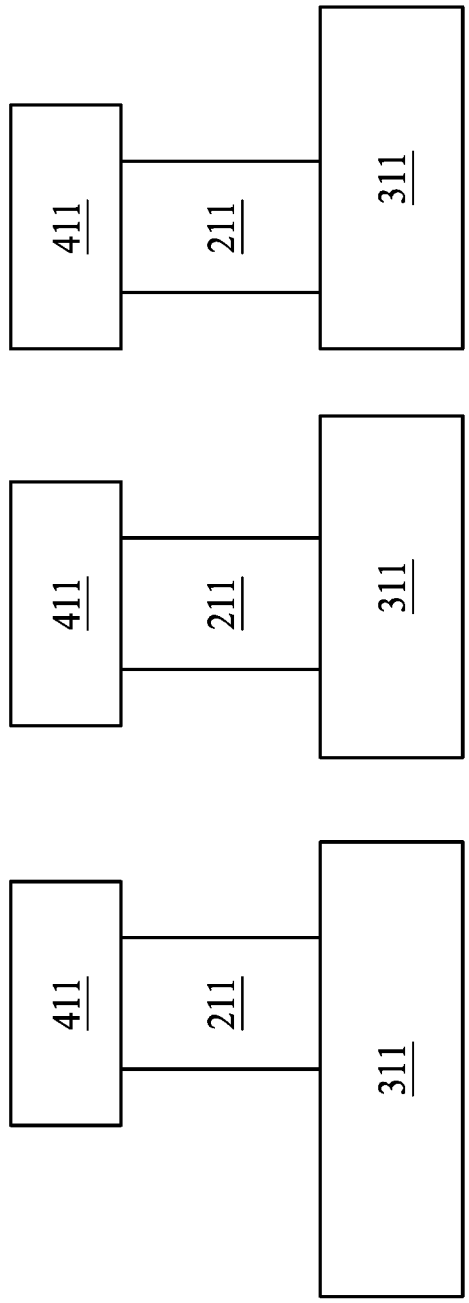
FIG. 14 is a cross sectional view of three different layers to be formed from different layouts in a semiconductor device in accordance with some embodiments of the present disclosure.

FIG. 14 shows different layers to be formed in the semiconductor device in accordance with a top view similar to FIG. 13, and FIG. 14 is a cross-sectional view of a semiconductor device according to some embodiments along a line A-A' annotated in FIG. 13. As shown in FIG. 14, third features 311 shown are formed in a first layer by transferring the third features 301 from a photomask including the third layout 30; fourth features 411 are formed in a third layer by transferring the fourth features 401 from a photomask including the fourth layouts 40; and second features 211 are formed in a second layer by transferring the shifted second features 202 from a photomask including a modified layout. As mentioned above, the modified layout is generated, selected and outputted to a photomask by the above illustrated methods, and the modified layout, for example, can be the virtual layout 23. In some embodiments of the present disclosure, each of the second features 211 is entirely disposed in the common area (i.e. the first layout 11) between each of the third features 311 and each of the corresponding fourth features 411. In some embodiments of the present disclosure, the third layout 30 and the fourth layout 40 are generated after the OPC operation from different design layouts. The present disclosure provides a method for manufacturing a photomask, an overlay area of different layers can be increased, and disconnection issue can be reduced. For ease of illustration and understanding, only distances along the direction X are considered in calculating RP of the shifted second features 202 and the first features 101. However, in some embodiments of the present disclosure, distances along a direction Y are also considered to calculate RP of the shifted second features 202 and the first features 101 following similar concept as above illustrated, and it is not repeated herein. Again, the most optimal score can be a greatest or lowest score, or a score closest to a predetermined value out of the scores acquired for every virtual layout.

Figure 15:
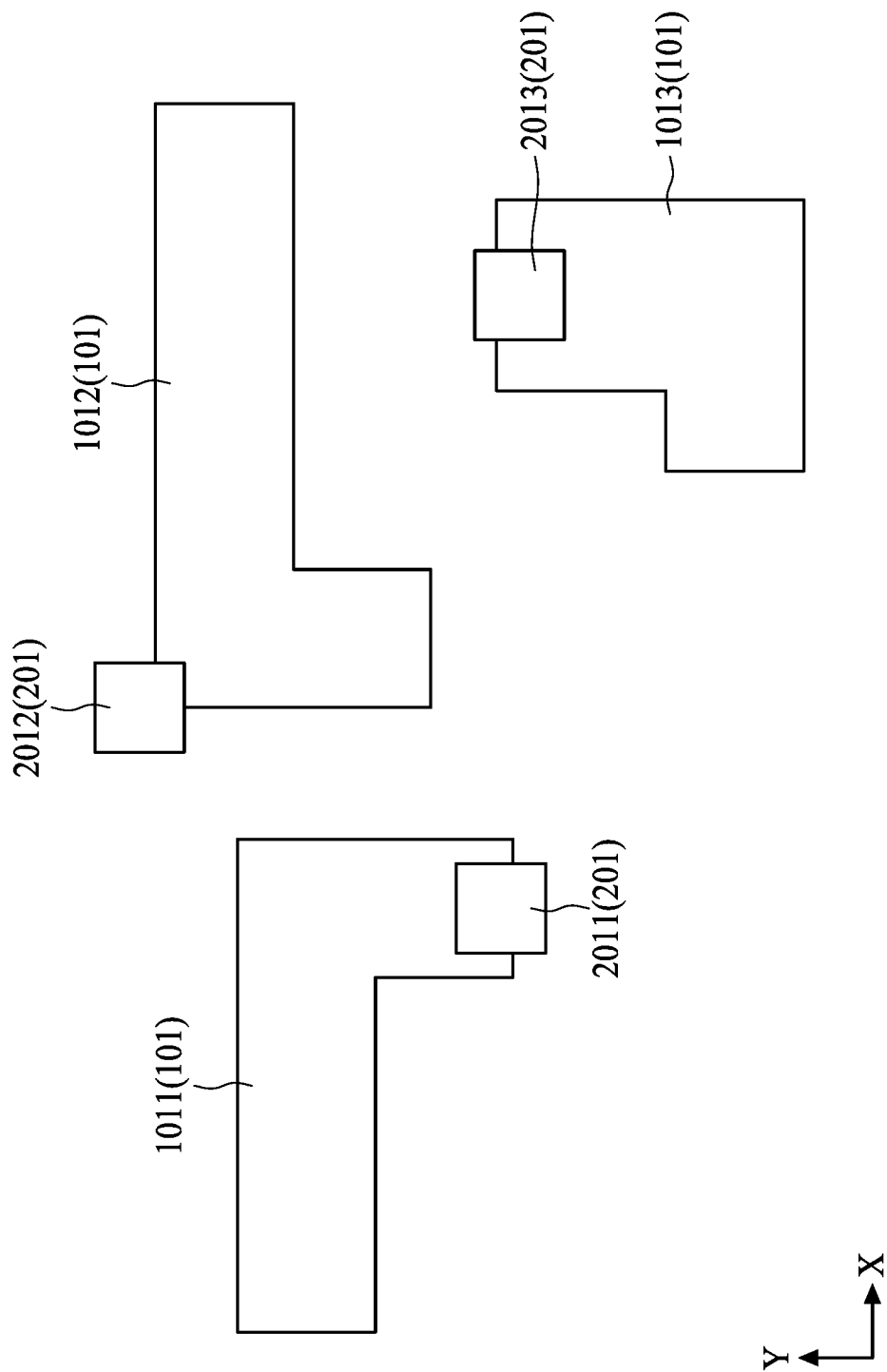
FIG. 15 is a diagram of a second layout overlapping a first layout in accordance with some embodiments of the present disclosure.

In some embodiments of the present disclosure, the second features 201 are shifted along the direction Y or both the directions X and Y to generate the plurality of virtual layouts. As shown in FIG. 15, in accordance with some embodiments of the present disclosure, a first layout 12 is provided in (S21) of the method M20. The first layout 12 includes a plurality of first features 102, which includes first features 1011, 1012 and 1013. A second layout 20 including a plurality of second features 201 is provided in (S21) of the method M20. The plurality of second features 201 includes second features 2011, 2022 and 2023 corresponding to the first features 1021, 1022 and 1023 respectively. The first layout 11 represents a pattern of a first layer to be formed in a semiconductor device or on a semicondcutor wafer, and the second layout 20 represents a pattern of a layer to be formed over or at a different level of elevation from the first layer. The first features 102 are also shown in FIG. 15 for illustration of relative positioning of the first features 102 and the second features 201, but the first features 102 are not included in the second layout 20.

Figure 16:
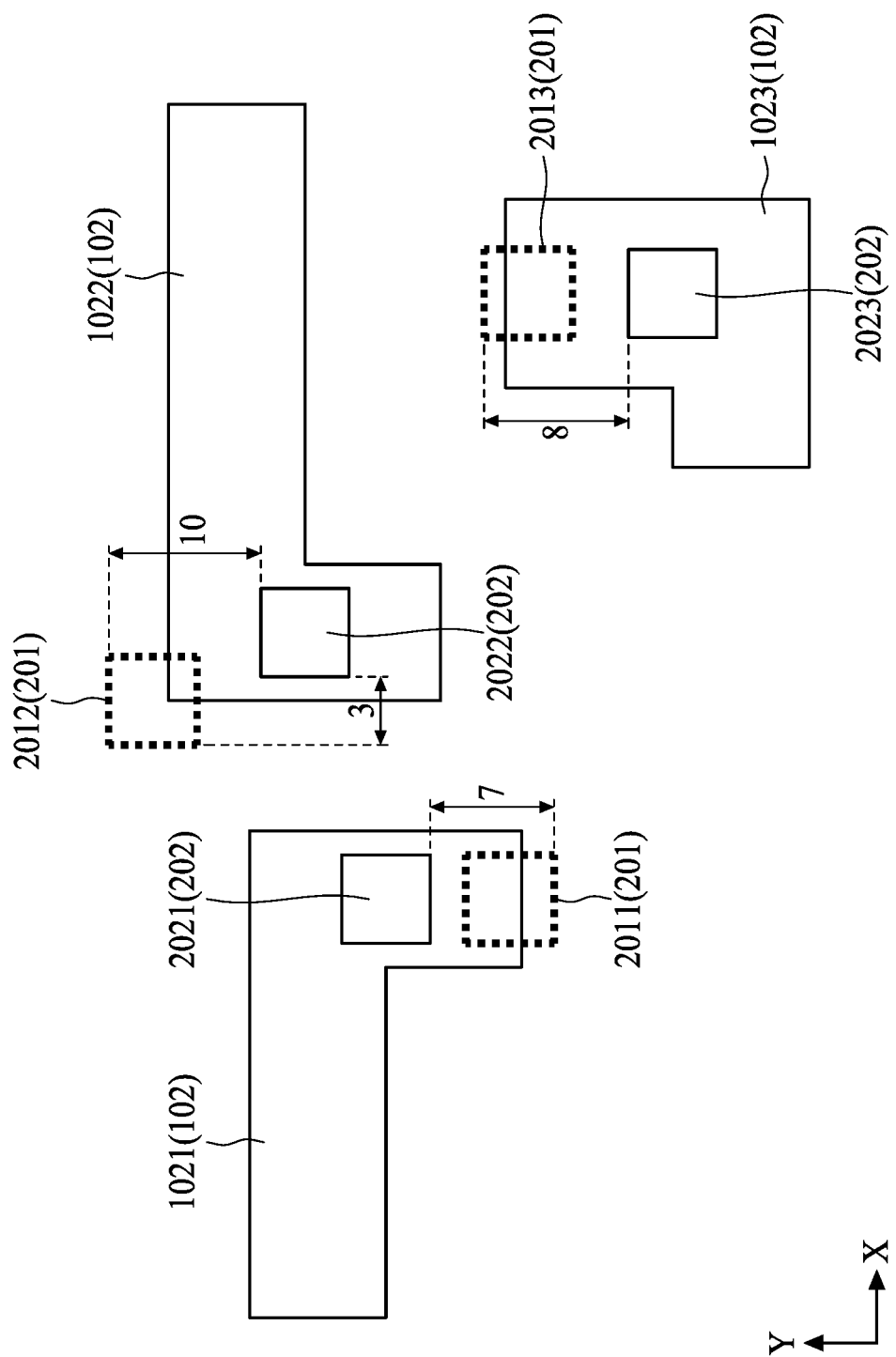
FIG. 16 is a diagram of a virtual layout overlapping the first layout shown in FIG. 15 in accordance with some embodiments of the present disclosure.

A plurality of virtual layouts is generated from the second layout by shifting at least one of the second features 201 along the direction Y and/or the direction X in (S11) of the method M10 or in (S22) of the method M20. Following the concept and method illustrated above, a modified layout 12 as shown in FIG. 16 is determined according to (S12) and (S13) of the method M10 or (S23) and (S24) of the method M20. The second feature 2011 is shifted up by 7 units to become the shifted second feature 2021; the second feature 2012 is shifted down by 10 units and right by 3 units to become the shifted second feature 2022; and the second feature 2013 is shifted down by 8 units to become the shifted second feature 2023. A unit of distance suitable for to calculating a distance of shifting can be selected, and the unit can be a nanometer, 10 nanometers or other suitable unit of distance of shifting. The unit is not limited herein. As mentioned above, the modified layout is outputted to a photomask in (S14) of the method M10 or (S25) of the method M20.

In some embodiments of the present disclosure, the second layout 20 may be a second design layout generated or provided by a circuit designer, and the OPC operation is performed to generate the virtual layouts. In some embodiments of the present disclosure, at least two of the second features 201 are shifted concurrently to generate the virtual layouts. In some embodiments of the present disclosure, only one of the second features 201 is shifted to generate the virtual layouts.

In some embodiments of the present disclosure prior to generating the virtual layouts, the second features 201 of the second layout 20 are partitioned into several groups. There may be thousands, millions or billions of the second features 201 included in the second layout 20 across an entire wafer, and calculating positions of all the second features 201 at the same time can be difficult. The positions of the second features 201 in the same group can be calculated and shifted together because shifting one second feature 201 may influence positions of other second features 201 around the shifted second feature 201 due to the design rule and limits of lithography. The partitioning operation is performed according to a density of the second features 201 within a region. The groups of the second features 201 are separated from each other by a low-density region having the second features 201 with a low density. Thus, shifting fewer second features 201 at a time can simplify the calculations and reduce time needed for generating the virtual layouts and determining the modified layout. In addition, since the second features 201 in the low-density region may have greater distances between adjacent second features 201, shifting of one second feature 201 in the low density region may not have much influence on the nearby other second features 201. Calculations and time needed for processing the second features 201 in the low-density region can be further simplified and reduced.

Some embodiments of the present disclosure provide a method for manufacturing a photomask. The method includes generating a plurality of virtual layouts; calculating a score for each of the plurality of virtual layouts in accordance with a total overlay area; comparing the scores of the plurality of virtual layouts and determining a modified layout having a target score out of the plurality of virtual layouts; and outputting the modified layout to a photomask. Each of the virtual layouts includes a plurality of the shifted features.

Some embodiments of the present disclosure provided a semiconductor manufacturing method. The semiconductor manufacturing method includes providing a first layout including a plurality of first features and a second layout including a plurality of second features, wherein at least one of the second features partially overlaps at least one of the first features; generating a plurality of virtual layouts from the second layout, wherein each of the plurality of virtual layouts includes a plurality of shifted second features; calculating a score for each of the plurality of virtual layouts in accordance with a total overlay area between the plurality of first features and the plurality of shifted second features; comparing the score of each of the plurality of virtual layouts and determining a modified second layout having a target score out of the plurality of virtual layouts; and outputting the modified second layout to a photomask.

Some embodiments of the present disclosure provided a semiconductor manufacturing method. The semiconductor manufacturing method includes providing a first layout of a first layer to be disposed in a semiconductor device; generating a second layout of a second layer according to a design rule, the second layer overlapping the first layout from a top view perspective; calculating a score in accordance with an offset between the first layout and the second layout; subtracting a predetermined value from the score to generate a delta; and adjusting the second layout of the second layer according to the design rule to reduce the delta if the delta exceeds a threshold value.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor manufacturing method, comprising:
providing a first layout including a plurality of first features and a second layout including a plurality of second features, wherein at least one of the second features partially overlaps at least one of the first features, and the first layout and the second layout are at different levels;
shifting the second layout to generate a plurality of virtual layouts from the second layout, wherein each of the plurality of virtual layouts includes a plurality of shifted second features;
calculating a score for each of the plurality of virtual layouts in accordance with a total overlay area between the plurality of first features and the plurality of shifted second features;
comparing the score of each of the plurality of virtual layouts and determining a modified second layout having a target score out of the plurality of virtual layouts; and
outputting the modified second layout to a photomask.

2. The semiconductor manufacturing method of claim 1, the target score is the greatest score out of the scores of the plurality of virtual layouts.

3. The semiconductor manufacturing method of claim 1, wherein the score of the virtual layout is calculated based on the total overlay area and relative positions of the plurality of first features and the plurality of shifted second features.

4. The semiconductor manufacturing method of claim 3, wherein the relative positions are determined by calculating a distance between a center of each of the plurality of first features and a center of each of the plurality of shifted second features.

5. The semiconductor manufacturing method of claim 1, wherein the plurality of first features and the plurality of the shifted second features are disposed sequentially in a semiconductor.

6. The semiconductor manufacturing method of claim 1, prior to providing the first layout, further comprising:
providing an original first layout comprising a plurality of original first features; and
shifting the plurality of original first features to provide the first layout.

7. The semiconductor manufacturing method of claim 1, wherein the plurality of first features of the first layout and the plurality of second features of the second layout represents a common area of two layers at different levels of elevation in a semiconductor device.

8. A semiconductor manufacturing method, comprising:
providing a first layout of a metal layer to be disposed in a semiconductor device;
generating a second layout of a via layer to be disposed in the semiconductor device over the metal layer, the second layout overlapping the first layout from a top view perspective;
calculating a score in accordance with an offset between the first layout and the second layout;
subtracting a predetermined value from the score to generate a delta;
shifting the second layout of the via layer to reduce the delta if the delta exceeds a threshold value.

9. The semiconductor manufacturing method of claim 8, wherein the offset is determined by a total overlay area of the first layout and the second layout from a top view perspective.

10. The semiconductor manufacturing method of claim 8, wherein the offset is determined by a total overlay area and a distance between a center of the first layout and a center of the second layout.

11. The semiconductor manufacturing method of claim 8, wherein the via layer is sequentially formed over the metal layer for electrical connection with the metal layer of the semiconductor device.

12. The semiconductor manufacturing method of claim 8, wherein a feature of the via layer is outside of a coverage area of the metal layer prior to shifting the second layout of the via layer.

13. The semiconductor manufacturing method of claim 1, wherein the plurality of virtual layout and the second layout are substantially at a same level.

14. A method for manufacturing a semiconductor device, comprising:
providing a first layout including a plurality of first features and a second layout including a plurality of second features;
shifting the second layout to generate a modified layout from the second layout, wherein the modified layout includes a plurality of shifted second features overlapping the first layout from a top view perspective;
outputting the first layout to a first photomask and forming a metal layer of a semiconductor device through the first photomask; and
outputting the modified second layout to a second photomask and forming a via layer over the metal layer of the semiconductor device through the second photomask.

15. The method of claim 14, wherein the first layout and the second layout are formed in an interconnect structure of the semiconductor device at different levels of elevation.

16. The method of claim 14, wherein each of the plurality of shifted second features at least partially overlaps each of the plurality of first features.

17. The method of claim 14, wherein the modified layout is generated by shifting at least one of the second features of the second layout.

18. The method of claim 14, wherein the plurality of shifted second features in the modified layout is shifted according to a plurality of shift values relating to the plurality of second features of the second layout.

19. The method of claim 14, wherein the via layer is electrically connected to the metal layer.

20. The method of claim 14, wherein the first layout is generated from a design layout after an optical proximity correction (OPC) operation.

\* \* \* \* \*